United States Patent [19]

Adamski et al.

[11] 4,097,883

[45] Jun. 27, 1978

[54] CAMERA GRIP

[75] Inventors: Gunter Adamski; Claus Prochnow, both of Brunswick, Germany

[73] Assignee: Rollei-Werke Franke & Heidecke, Brunswick, Germany

[21] Appl. No.: 721,891

[22] Filed: Sep. 9, 1976

[30] Foreign Application Priority Data

Sep. 17, 1975 Germany ............................. 2541384

[51] Int. Cl.² ............................................ G03B 17/56
[52] U.S. Cl. ..................................... 354/293; 248/178
[58] Field of Search ........................... 354/81, 82, 293; 352/243; 248/176, 177, 178, 179, 182, 183, 184, 185, 186, 359, 360

[56] References Cited

U.S. PATENT DOCUMENTS 2,961,937 11/1960 Karpf ...................................... 354/82
3,187,658 6/1965 Debrie ..................................... 354/82
3,893,144 7/1975 Funderburk .......................... 354/293

FOREIGN PATENT DOCUMENTS 490,344 1953 Canada ................................. 354/293
1,218,625 1960 France ................................... 354/293
652,791 1951 United Kingdom ................. 354/293
912,577 1962 United Kingdom ................. 354/293

*Primary Examiner*—Edna M. O'Connor
*Attorney, Agent, or Firm*—Ralf H. Siegemund

[57] ABSTRACT

The grip part proper is angularly adjustably connected to a head carrying the camera whereby the grip axis and the axis of rotation are inclined to each other and the latter is inclined to the center axis of the head. The correspondingly oblique interface is additionally used to hold an adjustable ring carrying a camera release switch.

7 Claims, 7 Drawing Figures

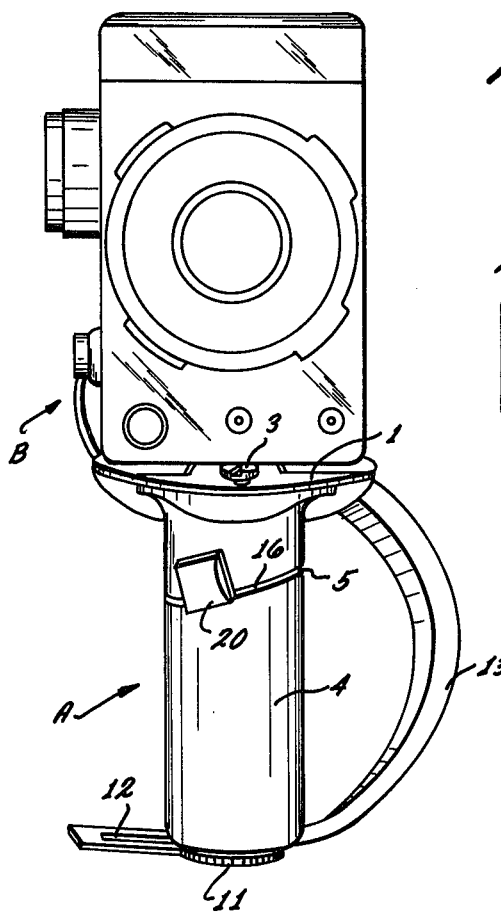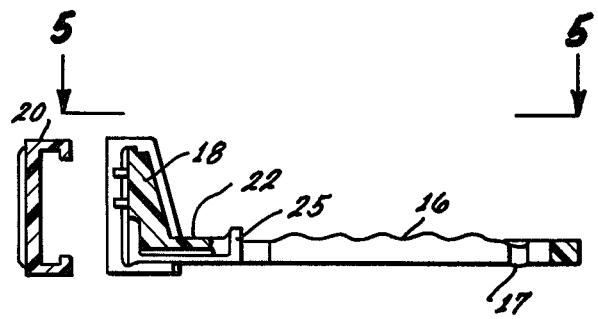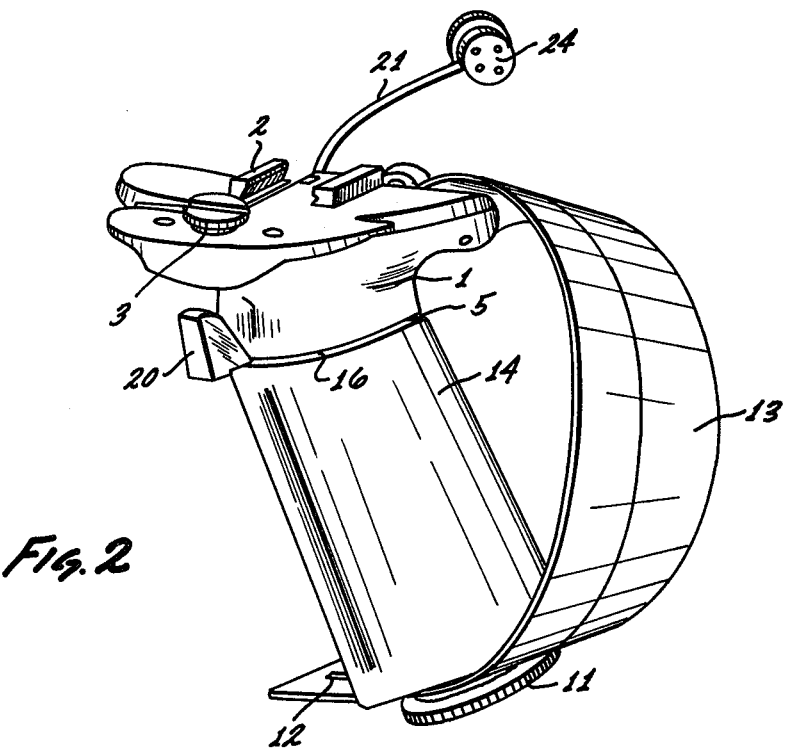

CAMERA GRIP

BACKGROUND OF THE INVENTION

The present invention relates to a grip for photographic and movie cameras, and more particularly, the invention relates to a pistol type grip for such camera, having a head for fastening to the bottom of the camera and hand grip part proper.

Pistol grip type holders for cameras are already widely in use. It was found, however, that even upon limiting a particular grip construction to one type of camera, it is still difficult to accommodate all of the different demands and peculiarities of the users. One difference, of course, arises from the different ways left-handed and right-handed persons will hold the grip. A grip was found to be particularly handy for, e.g. right-handed persons if it has a forwardly inclined position but with a slant to the right. That, however, is quite awkward for a left-handed person. It has been tried also to provide a forward or backward slant for the grip axis, in the vertical plane of (overall) symmetry of the camera. Such a construction does not discriminate between left and right-handed persons but the advantage of a sideways slant had to be abandoned here.

A particular aspect to be considered is also to be seen in that right-handed or left-handed use of the camera is not exclusively tied to right and left handedness of the user. Thus, the specific location of adjusting elements, e.g. focussing, exposure, metering, etc., may make it more practical to hold the camera in one particular hand; that again may be convenient for right-handed people but is less so for left-handed individuals (or vice versa) if again the hand grip is constructed for right-handed persons.

DESCRIPTION OF THE INVENTION

It is an object of the present invention to provide a new and improved camera grip which is particularly designed for being held in one particular hand (e.g. for reasons of the particular camera construction) but which can be adjusted to meet the individual requirements of the user.

In accordance with the present invention, it is suggested to bipart the grip into a grip part proper and a head, interfacing with each other in a planar, preferably circular, preferably inclined interface permitting rotation about an axis which is also inclined to the center axis of the grip part by an acute angle. Rotation is preferably provided through a clamp bolt or tightening screw whose one end is accessible from near the bottom of the grip part, the other end extending threadedly through the interface into the head providing for the rotatable connection between the head and the grip part.

A camera release key is preferably provided on an annulus being separately adjustable and otherwise disposed in the interface. A hand strip is also adjustably fastened to the grip part.

The inventive grip permits stepless adjustment of the grip part into the most desirable position, and the release key can then be positioned commensurate with the adjustable position which the strap length is adjusted to better fit the hand and grip of the user.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a front view of a movie camera with attached grip constructed in accordance with the preferred embodiment, showing the grip in a straight adjusting position;

FIG. 2 is a perspective view of the grip without camera but with lateral slant;

FIG. 4 is a cross-section through a particular adjusting annulus with separated release key and being a part of the grip;

Proceeding now to the detailed description of the drawings, FIG. 1 shows pistol grip type camera hand grip A being attached to a movie camera B. The grip A has a head 1 and a grip part proper 4. As can be seen from FIG. 2, head 1 is provided on its top with a quick action type, releasably fastener 2 being, for example, of the snap on or slip on variety. Additionally, head 1 has a holder or shoe 3 for a flash light.

Figure 3:
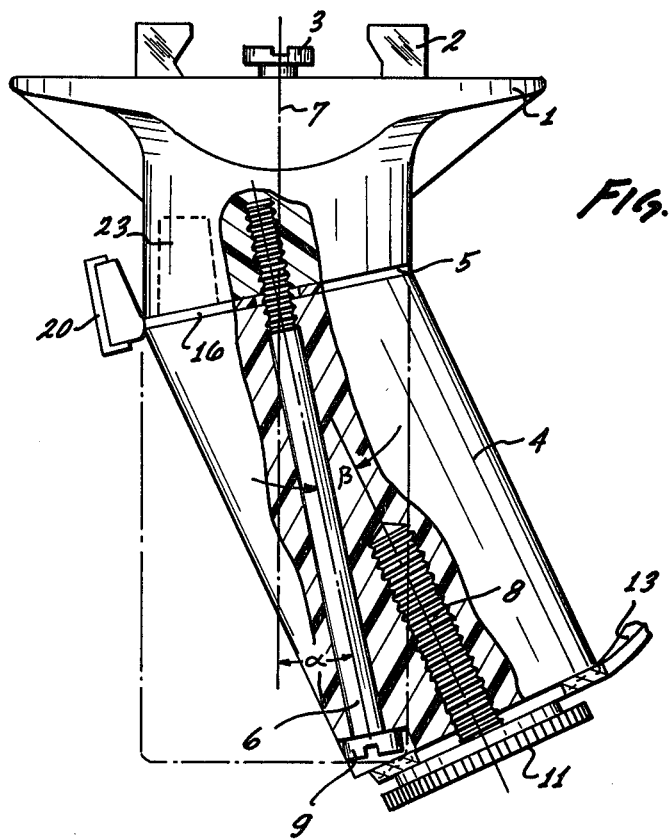
FIG. 3 is a front view (partially in section) of the grip as shown in FIG. 2.

Head 1 and grip 4 are actually separate parts having an interface 5 and being interconnected by an elongated holt 9, tensioning and tightening the parts 1, 4 together. The interface 5 is inclined by the center axis 7 of the head, the latter axis extending at right angles to the support surface on top of head 1, so that the latter surface has an angle $\alpha$ to the interface 5. The bolt 9 is particularly located in the vertical center axis 6 of and on interface 5. The center axis 6 is also the turning axis of hand grip 4 while the longitudinal axis 8 of the latter is obliquely oriented thereto at an acute angle $\beta$.

Upon turning hand grip 4, axis 8 revolves about axis 6 and thereby outlines a cone, whose apex is, approximately, at least located at the interseciton of interface 5 and axis 6. The angle $\beta$ is limited in that bolt 9 should be disposed completely inside of the grip. It can be seen that the head of bolt 9 is accessible for manipulation close to the bottom of grip part 4.

Axis 6 coincides with the center axis of bolt 9 which, in turn, is inclined by the acute angle $\alpha$ to the head axis 7. In the specific instance shown in FIG. 3 that inclination is adjusted to extend to the right (for a view from the front).

The illustrations show angles $\alpha$ and $\beta$ about to be equal. This, however, is not essential in principle. The dash dot position in FIG. 3 shows grip part 4 in a neutral or normal position in which the oblique inclinations of the surfaces of parts 1 and 4 interfacing at 5, complement each other in the sense that handle axis 8 extends transversely to the upper support plane of head 1 for the camera which plane is, of course, at right angles to the head center axis 7. This position, however, requires $\alpha = \beta$.

Now, upon turning handle grip 4 by 180°, the grip 4 assumes the illustrated position of FIG. 9, in which the grip 4 is laterally slanted but not forwardly or rearwardly inclined. The total angle of inclination of the grip 4 relative to the center axis 7 of head 1 is $\alpha + \beta$ or $2\alpha$. Before reaching that position, but upon being turned by 90° only, the hand grip has a rearward or forward inclined position (depending on the direction of turning) and at an inclination angle $\beta$, but without sideways or lateral slant. For inbetween positions one can readily obtain forward-lateral grip slant or a rearward lateral slant of the grip 4.

It can, thus, be seen that the grip is designed to be held by one particular hand, and users can now adapt the overall slant in particular manner, whereby a full range of sideway slants to both sides is not needed but differences in forward or rearward slants and different side slants to one side are readily obtainable in a simple manner.

The interface 5 is preferably a circular one, and the rotation occurs about an axis that traverses the center of that circle. This way, one obtains a smooth transition between elements 1 and 4 in each position by the latter. This is particularly so as the head 1 has a lower contour that matches the contour of the grip 4.

The bottom of grip 1 is traversed by a tension bolt 11 which passes also through a longitudinal slot 12 at the lower end of a backhand looping strap 13. This way, strap 13 is fastened at variable length. The upper end of the strap is provided with an eye slipped over a head pin 14 of head 1. The eye and, therefor, this strap end, can turn on the pin 14.

Figure 5:
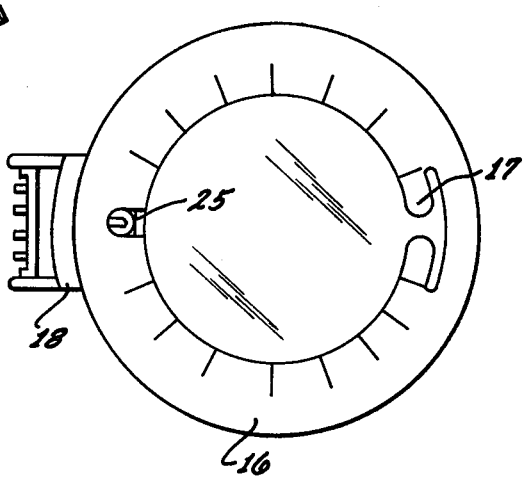
FIG. 5 is an elevational view taken along lines 5, 5 in FIG. 4.
Figure 6:
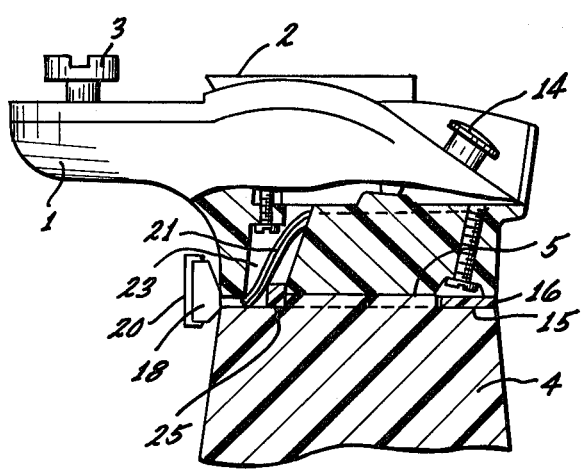
FIG. 6 is a longitudinal section view of a portion of the grip, particularly through the head thereof.
Figure 7:
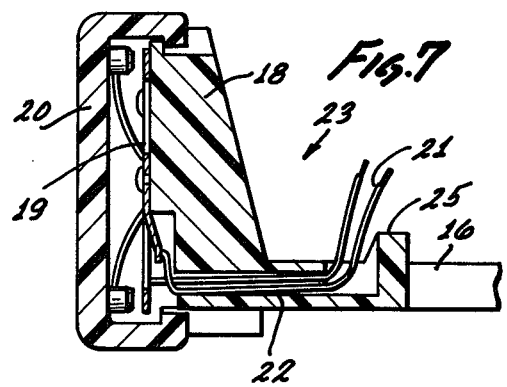
FIG. 7 is an enlarged, cross-section view of the release key of the grip.

FIG. 6 shows interface 5 of head 1 and hand grip 4 in greater detail. It can readily be seen that the interface has an offset portion so that an annular gap 15 results. Gap 15 receives a flat annulus 16 shown by itself in FIGS. 4 and 5. Thus, ring 16 can be turned even if bolt 9 has been tightened, if gap 15 leaves sufficient play. Annulus 16 has upwardly bent lugs 17 which provide for a limited clamping action of the annulus, so that the latter cannot arbitrarily turn. One could make the annulus 16 thicker so that bolt 9 does clamp it too. The latter provision is simpler but it is actually preferred to provide for greater independence between the rotation impeding of ring 6 and the clamping action of bolt 9.

Annulus 16 is preferably made of plastic material and has its own handle 18 carrying electrical contacts 19 which, in turn, are covered by a key cap 20. The contacts and the key cap provide for electrically effective switching, camera release and trigger action. Conductors or leads 21 are clamped or otherwise fastened to the contacts 19. A duct 22 in handle 18 receives the leads which then run through the top of annulus 16 into an interior cavity 23 of head 1, and from there out of head 1 and to a plug 24 for connection to the remote-release input of the camera.

The leads 21 and the cavity 23 limit the range of angular displacement of annulus 16 so that the displacement of key 20 is limited accordingly. A nose 25 may provide additional and more positive stop action for limiting the movement of the annulus primarily for relieving leads 21 from any mechanical holding function. The nose 25 abuts at side walls of cavity 23.

The adjustability of the key 20 and annulus 16 has the primary function of moving the contacts into a position more convenient to the user of the camera, independently from the position of the grip 4. Please note that the range of adjustability of the ring 16 is limited by stop nose 25 and is determined by structure in the head 1 and not in the grip 4.

The new grip is quite simple to use. At first, its head is snapped onto or otherwise fastened to the camera. Next, bolt 9 is loosened and then hand grip 4 is turned into exactly the desired position. Now or later release key 20 is also shifted into the most convenient position and bolt 9 is fastened. Screw 11 is separately loosened for adjustment of the length of the strip 13, and refastened for clamping the strap in the adjusted position.

The invention is not limited to the embodiments described above but all changes and modifications thereof not constituting departures from the spirit and scope of the invention are intended to be included.

We claim:

1. Grip for photographic and motion picture cameras, comprising:
   a head with means for fastening the head to the camera in a particular support surface and having a first, plane interface surface;
   a hand grip part having a corresponding plane interface surface, interfacing with the first surface of the head; means for rotatably connecting the hand grip part to the head insert planar interface, there being an axis of rotation extending transversely to the planar interface between the head and the grip part; and
   the grip part having a center axis which has an acute, non-zero angle to said axis of rotation.

2. Camera grip as in claim 1, said interface having an acute angle to the support surface so that the axis of rotation is not at right angles to the said support surface.

3. Camera grip as in claim 1, said planar interface being circular.

4. Camera grip as in claim 1, said means for connecting including a tension bolt accessible near a bottom end of the grip part and providing the rotatable connection of the grip part to the head.

5. Camera grip as in claim 1, and including an annulus interposed between said grip part and said head in said interface; a key on the annulus extending outwardly therefrom serving as camera release key; and means for connecting the key to the camera.

6. Camera grip as in claim 1, and including a strap having a longitudinal slot near one end and an eye on its other end, the one end being releasibly fastened to a bottom of the grip part by means of clamp screw traversing the slot, the head having a pin receiving said eye.

7. Camera grip as in claim 6, the means for fastening being of the rapid action and release variety.

* * * * *

UNITED STATES PATENT AND TRADEMARK OFFICE
CERTIFICATE OF CORRECTION

PATENT NO. : 4,097,883
DATED : June 27, 1978
INVENTOR(S) : Günter Adamski and Claus Prochnow It is certified that error appears in the above-identified patent and that said Letters Patent are hereby corrected as shown below:

[75]  Günter Adamski; Claus Prochnow,
      both of Braunschweig, Fed.Republic of Germany

[73]  Rollei-Werke Franke & Heidecke,
      Braunschweig, Fed.Republic of Germany Signed and Sealed this Second Day of January 1979

[SEAL]

Attest:

RUTH C. MASON
*Attesting Officer*

DONALD W. BANNER
*Commissioner of Patents and Trademarks*